United States Patent
Campbell et al.

(10) Patent No.: US 9,137,176 B2
(45) Date of Patent: Sep. 15, 2015

(54) DUAL-ROLE MODULAR SCALED-OUT FABRIC COUPLER CHASSIS

(75) Inventors: Alexander Philip Campbell, Kanata (CA); Keshav Govind Kamble, Fremont, CA (US); Dar-Ren Leu, San Jose, CA (US); Vijoy A. Pandey, San Jose, CA (US); Atul Tambe, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 13/473,316

(22) Filed: May 16, 2012

(65) Prior Publication Data

US 2012/0294314 A1    Nov. 22, 2012

Related U.S. Application Data

(60) Provisional application No. 61/486,383, filed on May 16, 2011.

(51) Int. Cl.
*H04L 12/54* (2013.01)
*H04L 12/931* (2013.01)

(52) U.S. Cl.
CPC ............ *H04L 49/356* (2013.01); *H04L 49/40* (2013.01); *H04L 49/45* (2013.01)

(58) Field of Classification Search
None
See application file for complete search history.

(56) References Cited

U.S. PATENT DOCUMENTS

| | | | |
|---|---|---|---|
| 6,826,195 B1 | 11/2004 | Nikolich et al. | |
| 7,197,042 B2 | 3/2007 | Norman et al. | |
| 7,246,245 B2 | 7/2007 | Twomey | |
| 7,406,038 B1 | 7/2008 | Oelke et al. | |
| 8,780,931 B2 | 7/2014 | Anantharam et al. | |
| 2003/0200330 A1 | 10/2003 | Oelke et al. | |
| 2004/0028063 A1 | 2/2004 | Roy et al. | |
| 2004/0088538 A1 | 5/2004 | Isip et al. | |
| 2006/0018329 A1 | 1/2006 | Nielsen et al. | |
| 2006/0050738 A1* | 3/2006 | Carr et al. | 370/474 |
| 2008/0250120 A1 | 10/2008 | Mick et al. | |
| 2011/0066909 A1 | 3/2011 | Skirmont et al. | |
| 2012/0173935 A1 | 7/2012 | Skirmont et al. | |
| 2012/0287926 A1 | 11/2012 | Anantharam et al. | |
| 2012/0297103 A1 | 11/2012 | Kamble et al. | |
| 2014/0219286 A1 | 8/2014 | Anantharam et al. | |

OTHER PUBLICATIONS

Schuchart, "What's the Deal with High-Speed Storage?—By the time Fibre Channel hits 8 Gbps, iSCSI on 10 Gig Ethernet could be a worthy opponent", Network Computing, No. 1624, Nov. 2005.

(Continued)

*Primary Examiner* — Rhonda Murphy
(74) *Attorney, Agent, or Firm* — Schmeiser, Olsen & Watts LLP

(57) ABSTRACT

A scaled-out fabric coupler (SFC) chassis includes a plurality of root fabric cards installed on the one side of the SFC chassis. Each root fabric card has a plurality of electrical connectors. A plurality of line cards is installed on the opposite side of the SFC chassis. Each line card is one of two types of line cards. One of the two types of line cards is a switch-based network line card having network ports for connecting to servers and switches. The other of the two types of line cards is a leaf fabric card having fabric ports for connecting to a fabric port of a network element. Each of the two types of the line cards has electrical connectors that mate with one electrical connector of each root fabric card installed in the chassis.

25 Claims, 14 Drawing Sheets

(56) References Cited

OTHER PUBLICATIONS

Wirbel, "Router giants ratchet up IPTV rivalry IPTV", Electronic Engineering Times, No. 1440, Sep. 2006.
Conover, "Gigabit Ethernet Switches Set to Take on the Enterprise", Network Computing, No. 916, Sep. 1998.
Petrilla et al., "Common Pluggable Interface For 100GBase-CR10 and 100GBase-SR10", May 2009, 11 Pages.
InfiniBand Trade Association, "Supplement to InfiniBand Architecture Specification vol. 2 Release 1.2.1, Annex A6: 120 Gb/s 12x Small Form-factor Pluggable (CXP)" InfiniBand Architecture, vol. 2, Sep. 2009, 94 Pages.
Cisco Systems, "Cisco CRS Carrier Routing System Multishelf System Interconnection and Cabling Guide", Sep. 2011, San Jose, CA; 84 pages.
Non-Final Office Action in related U.S. Appl. No. 13/469,715, mailed on Nov. 5, 2013; 8 pages.
Notice of Allowance in related U.S. Appl. No. 13/469,715, mailed on Mar. 4, 2014; pages.
Non-Final Office Action in related U.S. Appl. No. 13/222,039, mailed on May 30, 2014; 11 pages.
Non-Final Office Action in related U.S. Appl. No. 14/245,026, mailed on Jul. 31, 2014; 8 pages.
Notice of Allowance in related U.S. Appl. No. 13/222,039, mailed on Nov. 6, 2014; 5 pages.
Final Office Action in related U.S. Appl. No. 14/245,026, mailed on Dec. 12, 2014; 7 pages.
Notice of Allowance in related U.S. Appl. No. 14/245,026, mailed on Feb. 12, 2015; 5 pages.

* cited by examiner

DUAL-ROLE MODULAR SCALED-OUT FABRIC COUPLER CHASSIS

RELATED APPLICATION

This application claims priority to and the benefit of U.S. provisional application No. 61/486,383, filed on May 16, 2011, titled "Architecture and Mechanism of Dual Role Modular Scaled Out Fabric Coupler Chassis System," the entirety of which provisional application is incorporated by reference herein.

FIELD OF THE INVENTION

The invention relates generally to data centers and data processing. More particularly, the invention relates to modular dual-role cell-based fabric chassis.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. The infrastructure of the data center, specifically, the layers of switches in the switch fabric, plays a central role in the support of the services. The architecture of the switch fabric can be instrumental to scalability, that is, the ability to grow the size of the data center.

SUMMARY

In one aspect, the invention features a scaled-out fabric coupler (SFC) chassis comprising a plurality of root fabric cards installed on one side of the SFC chassis. Each root fabric card has a plurality of electrical connectors. A plurality of line cards is installed on the opposite side of the SFC chassis. Each line card is one of two types of line cards. One of the two types of line cards is a switch-based network line card having network ports for connecting to servers and switches. The other of the two types of line cards is a leaf fabric card having fabric ports for connecting to a fabric port of a network element. Each of the two types of line cards has electrical connectors that mate with one electrical connector of each root fabric card installed in the chassis.

In another aspect, the invention features a distributed virtual chassis comprising a plurality of scaled-out fabric coupler (SFC) chassis. Each SFC chassis comprises a plurality of line cards installed on one side of the SFC chassis. A plurality of root fabric cards is installed on the opposite side of the SFC chassis. Each root fabric card is capable of connecting to multiple different types of line card. One of the multiple types of line cards is a switch-based network line card having network ports for connecting to servers and switches. The other of the multiple types of line cards is a leaf fabric card having fabric ports for connecting to a fabric port of a distributed line card (DLC) chassis. Each root fabric card further includes a cell-based fabric element that switches cells subdivided from a packet among the ports of the line cards installed in the SFC chassis.

In still another aspect, the invention features a scaled-out fabric coupler (SFC) chassis comprising a plurality of line cards installed on one side of the SFC chassis and a plurality of root fabric cards installed on the opposite side of the SFC chassis. Each root fabric card is capable of connecting to multiple different types of line cards having a same form factor. One of the multiple types of line cards is a switch-based network line card having network ports for connecting to servers and switches. The other of the multiple types of line cards is a leaf fabric card having fabric ports for connecting to a fabric port of a switching network element. Each root fabric card further includes a cell-based fabric element that switches cells subdivided from packets among the ports of the line cards installed in the SFC chassis.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Scaled-out fabric coupler (SFC) chassis described herein are multi-purpose with a multi-role nature, having a modular form factor. Installed in the back of an SFC chassis are root fabric cards. In front slots of the SFC chassis are leaf fabric cards, switch-based network (e.g., Ethernet) line cards, or a combination of both types. Accordingly, depending on the type of cards installed in the front of the chassis, the SFC chassis can be part of a distributed virtual chassis when installed entirely with leaf fabric cards connected to distributed line card (DLC) chassis, as a completely modular network switch chassis when installed entirely with switch-based network line cards, or as a hybrid distributed virtual chassis when installed with both leaf fabric cards coupled to DLC chassis and with switch-based network line cards. In any of these configurations, the SFC chassis operates as a single large and scalable cell-switched domain, switching traffic across those line cards installed in the front slots of the chassis.

Figure 1:
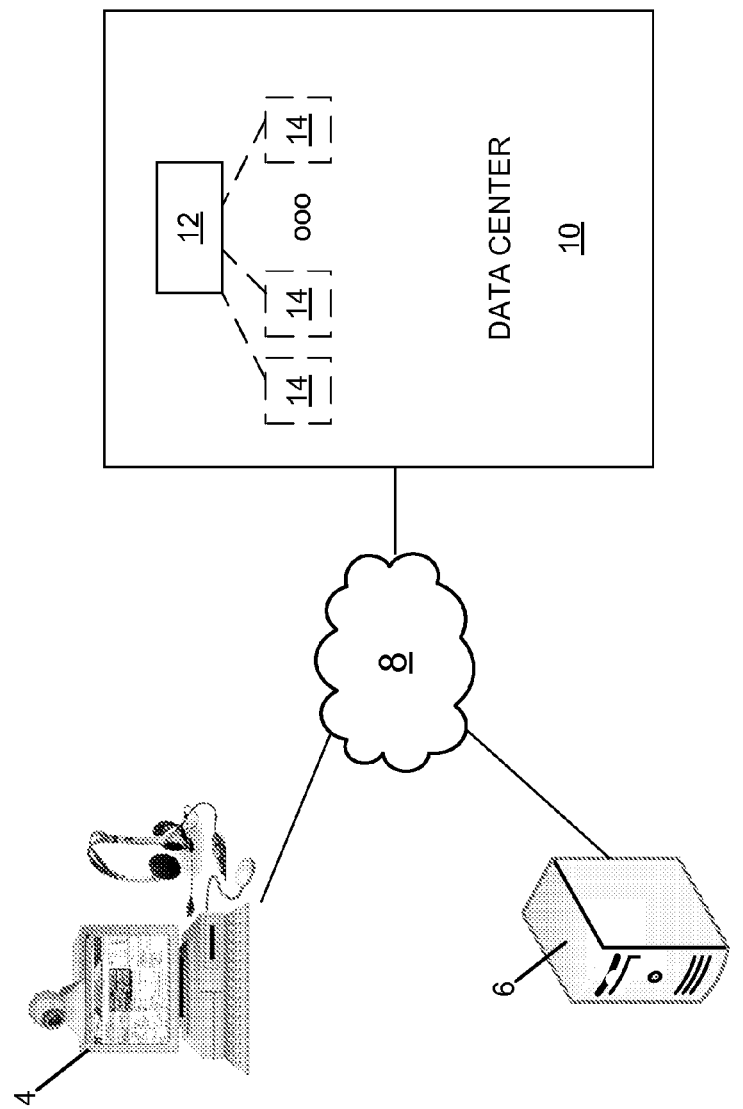
FIG. 1 is an embodiment of a networking environment including a data center, a server, and a management station.

FIG. 1 shows an embodiment of a networking environment 2 including a data center 10 in communication with a management station 4 and a server 6 over a network 8. Embodiments of the network 8 include, but are not limited to, local-area networks (LAN), metro-area networks (MAN), and wide-area networks (WAN), such as the Internet or World Wide Web. The data center 10 is generally a facility that houses various computers, routers, switches, and other associated equipment in support of applications and data that are integral to the operation of a business, organization, or other entities. The equipment of the data center 10 includes an SFC chassis 12. In some embodiments, the SFC chassis 12 is in communication with switching network elements 14, referred to herein as distributed line card (DLC) chassis. The data center 10 may be embodied at a single site or distributed among multiple sites. Although shown outside of the data center 10, either (or both) of the management station 4 and server 6 may be considered part of the data center 10.

The management station 4 can connect directly (point-to-point) or indirectly to a given DLC 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet, the management station 4 can access a command-line interface (CLI) of a given DLC 14 or a central control plane of the whole distributed system, which includes all DLCs 14 and all SFCs 12. In general, the server 6 is a computer (or group of computers) that provides one or more services to the data center 10, examples of which include, but are not limited to, email servers, proxy servers, DNS servers.

Figure 2B:
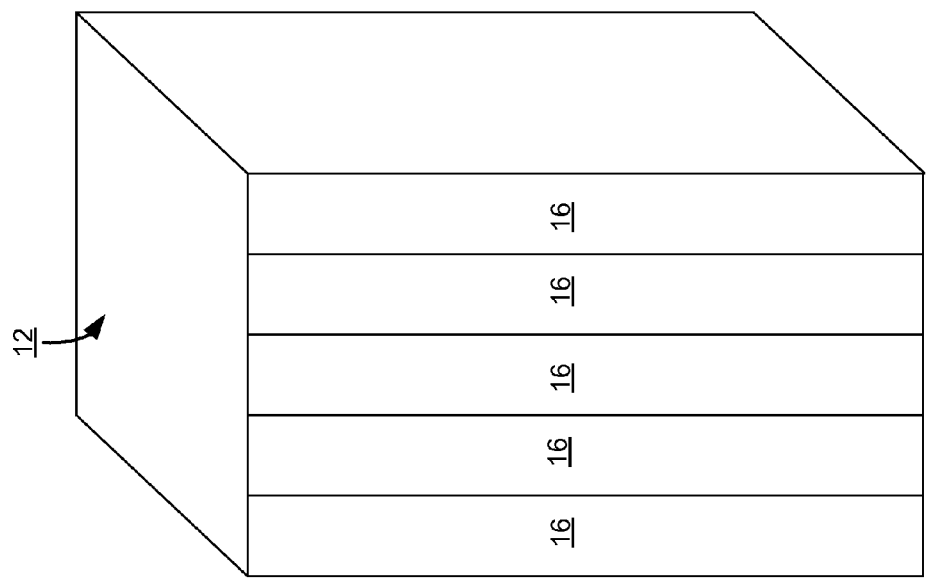
FIG. 2B is a back side view of the embodiment of the modular SFC chassis.
Figure 2A:
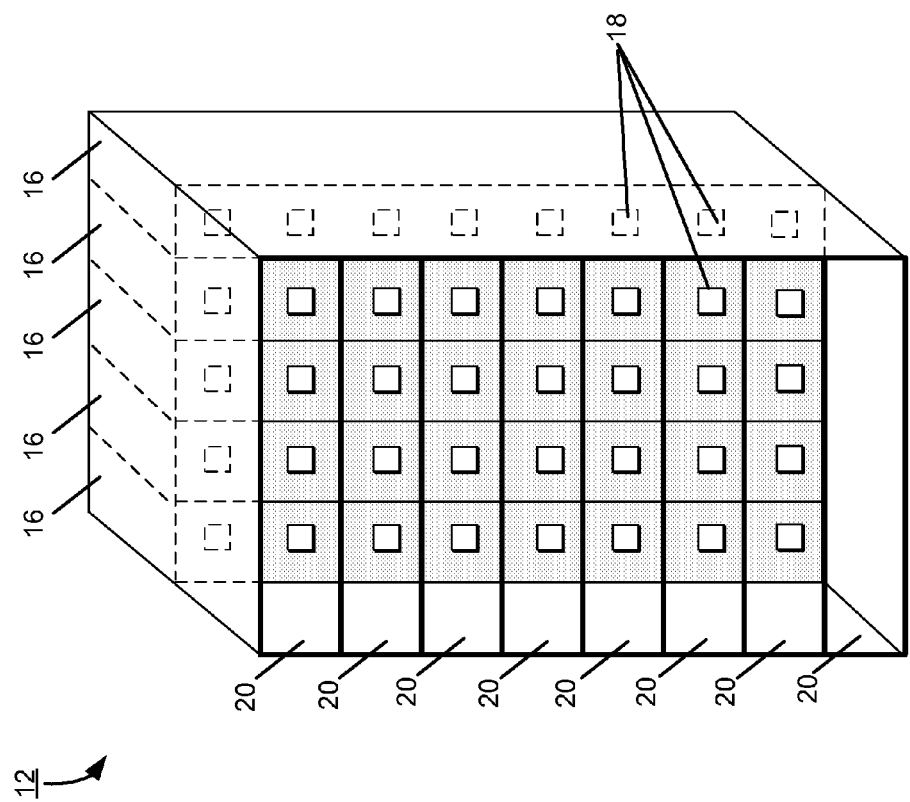
FIG. 2A is a front side view of an embodiment of a modular scaled-out fabric coupler (SFC) chassis comprised of multiple front slots.
Figure 3:
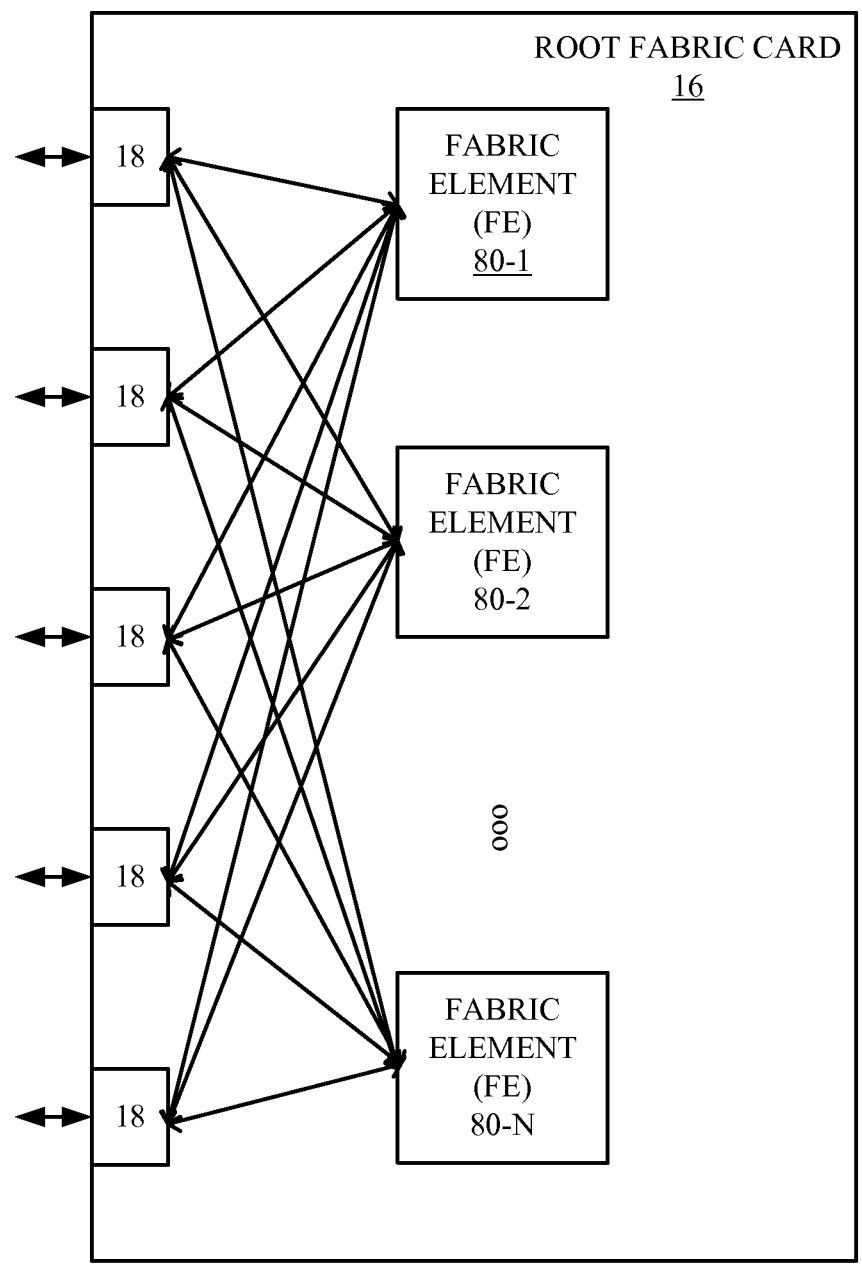
FIG. 3 is a diagram of an embodiment of a root fabric card.

FIG. 2A and FIG. 2B show a front view and rear view, respectively, of an embodiment of the SFC chassis 12. Installed vertically in the back of the SFC chassis 12 are cards 16, referred to as root fabric cards. Each root fabric card 16 has a plurality of front-facing electrical connectors 18 (also referred to as fabric ports 18) and houses a plurality of cell-based fabric elements (FIG. 3).

By the electrical connectors 18, each root fabric card 16 is adapted to interconnect physically with either of two different types of front line cards, a leaf fabric card and a switch-based network line card, as described in more detail below. The electrical connectors 18 of the root fabric card 16 are a superset of the mating electrical connectors of the two types of front line cards. For instance, consider that one type of line card communicates over 15 pins and that the other type of front line card uses 10 pins. In this instance, the electrical connectors 18 of the root fabric card 16 have 15 pins to accommodate the mating electrical connectors of both types of front line cards.

At the front side of the SFC chassis 12 are horizontal line card slots 20 (shown empty to expose the root fabric cards 16 installed in back). Each slot 20 receives a front line card of either type, both types of line cards having the same modular form factor. Back-facing electrical connectors (not shown) of the front line card align and mate with one row of electrical connectors 18 of the root fabric cards 16. By virtue of the mating electrical connectors, each front line card installed in any one of the slots 20 physically mates with each of the root fabric cards 16 installed in the SFC chassis 12.

Although the embodiment of the SFC chassis shown has eight slots and five root fabric cards, it is to be understood that other embodiments of the SFC chassis can have fewer or more than eight slots 20 and five root fabric cards 16. In addition, the slots 20 can instead be oriented vertically within the SFC chassis 12 and the root fabric cards 16 oriented horizontally without departing from the principles described herein; this orientation maintains the physical and electrical interconnections between each root fabric card and modular front line card.

FIG. 3 shows an embodiment of a root fabric card 16 including the fabric ports 18 and a plurality of cell-based switch fabric elements 80-1, 80-2, 80-N (generally, FE 80). An example implementation of the switch fabric elements 80 is the FE 1600 (BCM 88750), a fabric element produced by Broadcom, of Irvine, Calif. In this example, the root fabric card 16 has 5 fabric ports 18. With the root fabric card 16 installed vertically in the SFC chassis 12, each fabric port 18 aligns with one of the slots 20 (FIG. 2A); and this example of SFC chassis accordingly has 5 slots. Each fabric port 18 is in electrical communication with each fabric element 80 of the root fabric card 16, and each fabric element 80 switches cells between the fabric ports 18 based on destination information in the cell header.

Figure 4:
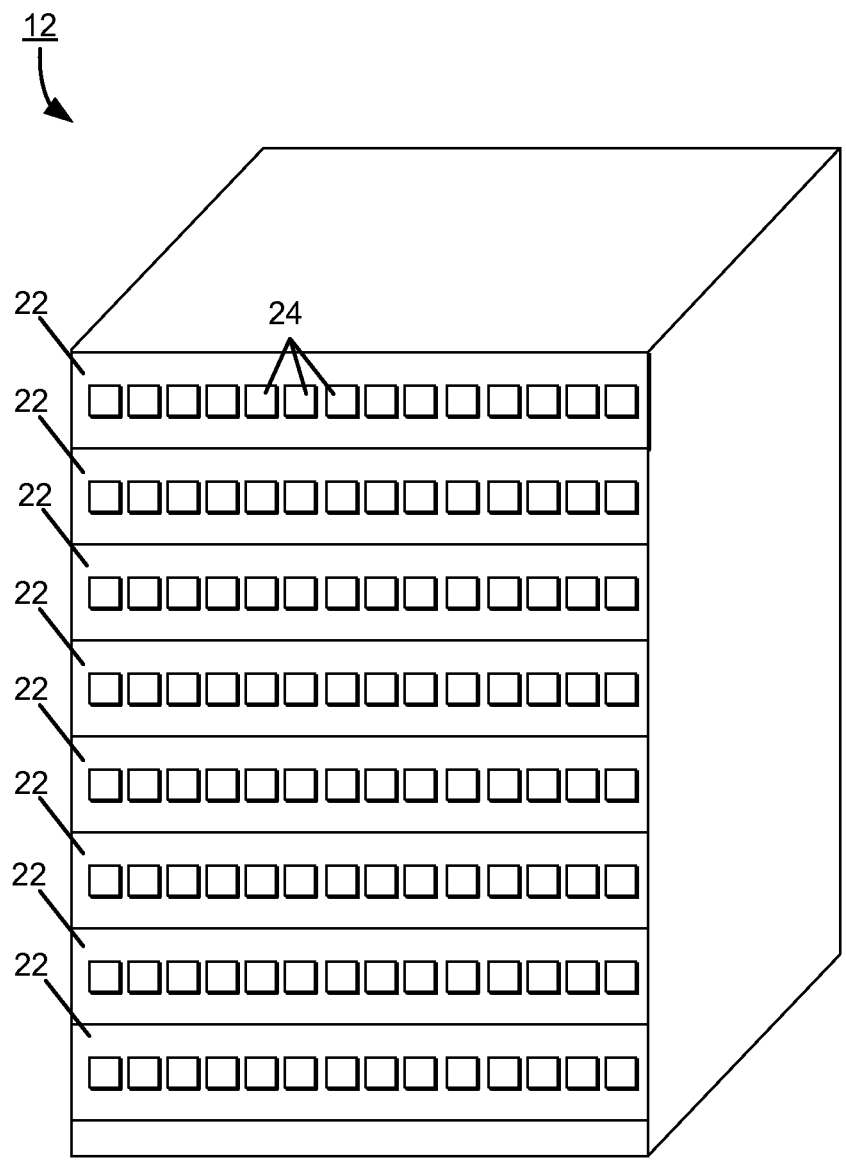
FIG. 4 is a front view of a first configuration of the modular SFC chassis with modular switch-based network line cards filling all of the chassis slots.

FIG. 4 shows a front view of a first configuration of the physical modular SFC chassis 12. Installed in all of the slots 20 (FIG. 2A) on the front side of the SFC chassis 12 are modular switch-based network line cards 22. Each switch-based network line card 22 has a plurality of front-facing network ports 24 for connecting to servers or other switches (external to the SFC chassis). In one embodiment, each switch-based network line card 22 has forty network ports 24, each of which is a 10G Ethernet port (the switch-based line card being referred to as an Ethernet line card). Electrical connectors 40 (FIG. 5) on the back-facing side of the switch-based network line cards 22 are in physical and electrical communication with electrical connectors 18 of each of the root fabric cards 16 (FIG. 2B) installed in the back of the modular SFC chassis 12. In this configuration, the SFC chassis 12 serves as a complete modular network switch chassis.

Figure 5:
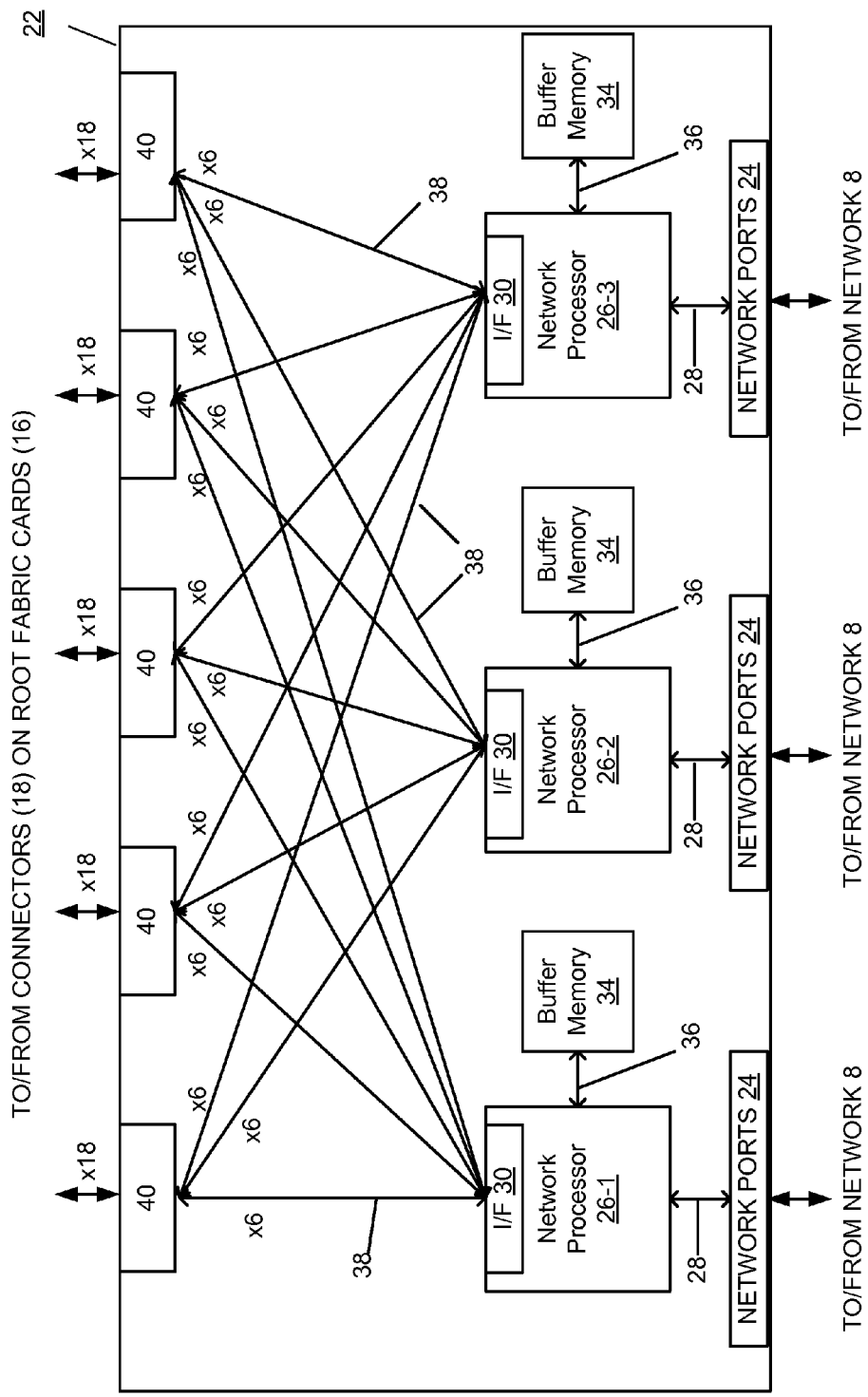
FIG. 5 is a diagram of an embodiment of a modular switch-based network line card.

FIG. 5 shows a functional block diagram of one embodiment of a switch-based network line card 22. In this embodiment, the switch-based network line card 22 is an Ethernet line card having a plurality of front Ethernet network ports 24 for transmitting and receiving Ethernet packet traffic to and from the network 8 (for example). The Ethernet line card 22 further includes three network processors (or switches) 26-1, 26-2, 26-3 (generally, 26). An example implementation of the network processors 26 is the BCM 88650, a 20-line rate ports, 10 GbE switch chip produced by Broadcom, of Irvine, Calif.

Each network port 24 is connected to one of the network processors 26 through a physical (PHY) interface 28; each PHY interface 28 supporting a subset of the front-facing network ports 24 of the Ethernet line card 22. In one embodiment, the PHY interfaces 28 include an XFI electrical interface (of a 10 Gigabit Small Form Factor Pluggable Module (XFP)) for each of the network ports 24.

Each network processor 26 has a fabric interface (IF) 30 and is in communication with buffer memory 34 over memory channels 36. In one embodiment, the buffer memory 34 is implemented with DDR3 SDRAM (double data rate synchronous dynamic random access memory) devices.

The fabric interface 30 of each network processor 26 includes a serializer/deserializer (SerDes), not shown, that preferably provides at least thirty-two channels 38 (not all channels need to be used in a given configuration). The SerDes includes a pair of functional blocks used to convert data between serial and parallel interfaces in each direction. In one embodiment, each SerDes channel 38 operates at a 10.3 Gbps bandwidth. In another embodiment, each SerDes channel 38 operates at approximately 25 Gbps.

In addition, each fabric interface 30 is in communication with an electrical (fabric) connector 40 over the SerDes channels 38. In the shown embodiment, six SerDes channels of each fabric interface 30 are selected and bundled to form a fabric connector 40; accordingly, in this embodiment each fabric connector 40 has 18 SerDes channels. Each of these fabric connectors 40 mates with a counterpart fabric connector 18 (FIG. 2A) of a root fabric card 16.

Figure 6:
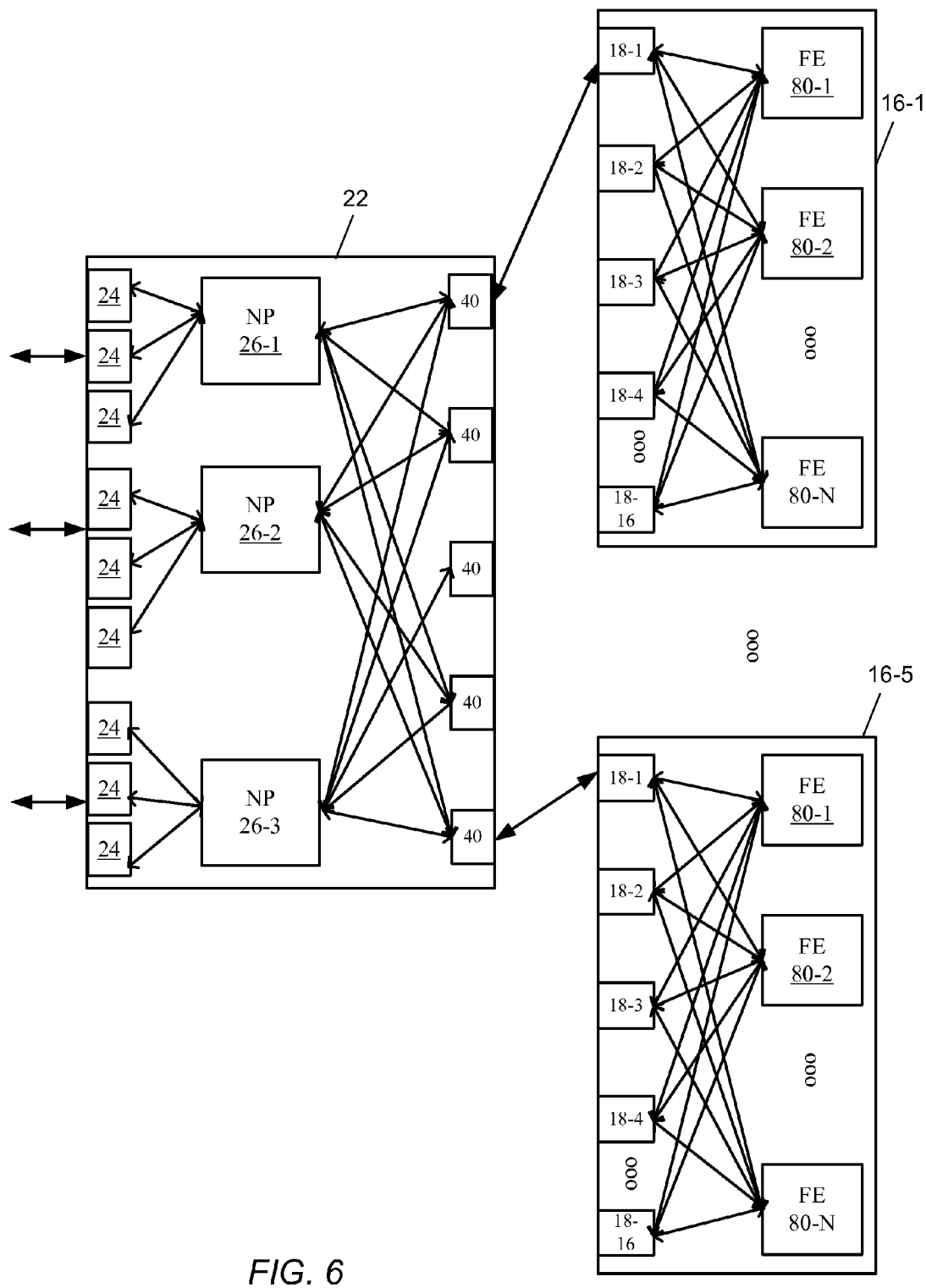
FIG. 6 is a diagram of the connectivity between the modular switch-based network line card of FIG. 5 and the root fabric cards of a modular SFC chassis.

FIG. 6 shows an example of the connectivity between the switch-based network line card 22 of FIG. 5 and the root fabric cards 16 in the SFC chassis 12. In this example, the SFC chassis 12 (FIG. 2A) can hold five root fabric cards 16-1 to 16-5, and has sixteen slots available (each root fabric card has 16 fabric connectors numbered 18-1 to 18-16. In the shown example, the network line card 22 resides in a topmost slot 20 (FIG. 2A) of the SFC chassis 12. In this slot position, each of the fabric connectors 40 of the network line card 22 connects to the topmost fabric port 18-1 of a different one of the five root fabric cards numbered 16-1 to 16-5.

Figure 7:
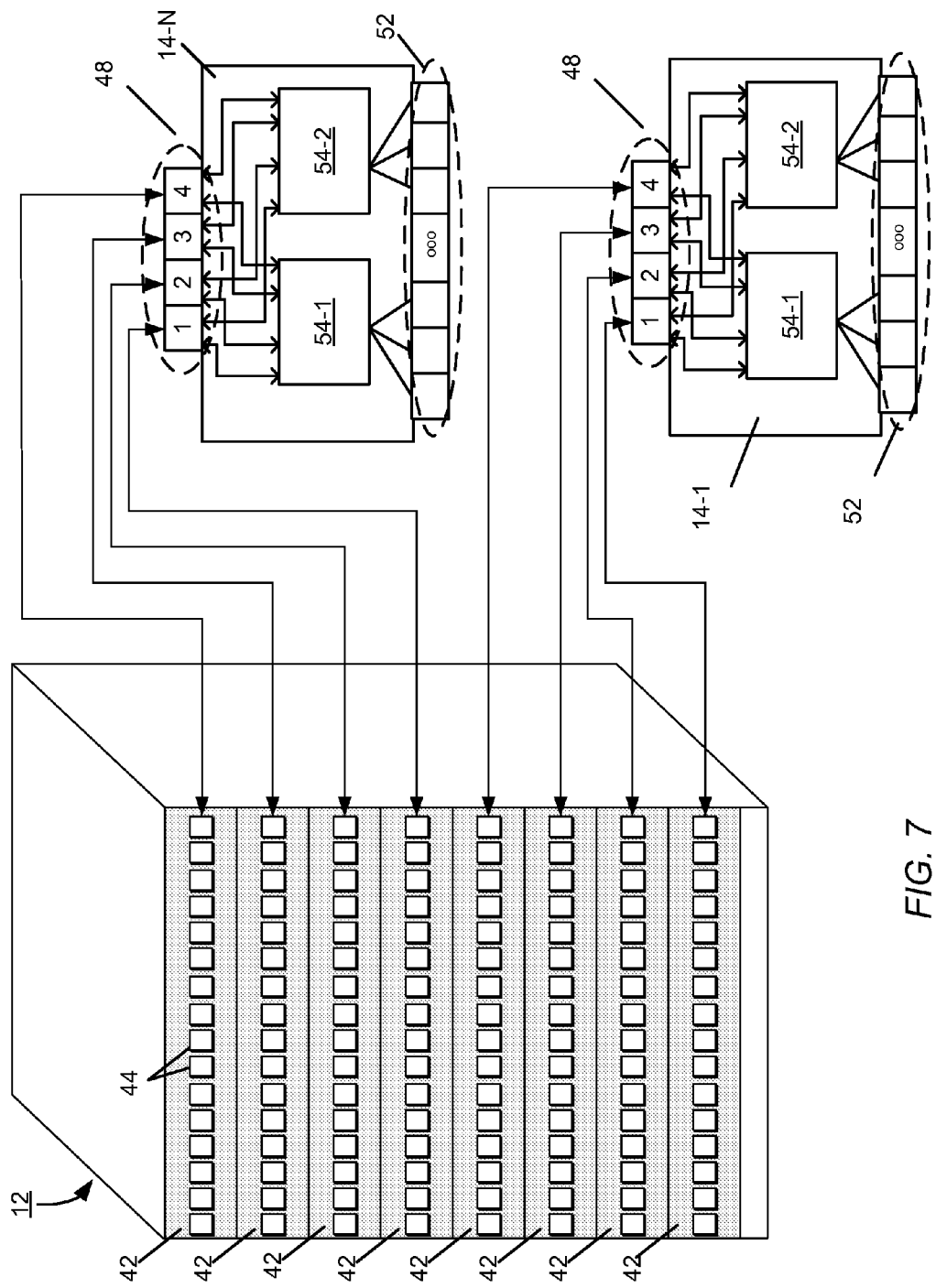
FIG. 7 is a front view of a second configuration of the modular SFC chassis in communication with a plurality of distributed line card (DLC) chassis.

FIG. 7 shows a front view of a second configuration of the physical modular SFC chassis 12. Instead of switch-based network line cards 22, as shown in FIG. 4, every horizontal slot 20 (FIG. 2A) on the front side of the SFC chassis 12 contains an SFC line card 42, also referred to as a leaf fabric card 42. Leaf fabric cards 42 have the same form factor as switch-based network (e.g., Ethernet) line cards 22, and either type of line card fits into a front slot 20 of the SFC chassis 12. Back-facing electrical connectors 86 (FIG. 8) of each leaf fabric card connect to every root fabric card 16 (FIG. 2B) installed in the SFC chassis 12. In this configuration, the SFC chassis 12 serves as a complete SFC box in a distributed virtual chassis, as described in more detail in connection with FIG. 14.

Leaf fabric cards 42 have a plurality of fabric ports 44. Each fabric port 44 of a leaf fabric card 42 connects to a fabric port 48 of a distributed line card (DLC) chassis or box 14. For example, in FIG. 7, fabric ports 44 of four different leaf fabric cards 42 connect to the four fabric ports 48 of the DLC 14-1; and fabric ports 44 of four other different leaf fabric cards 42 connect to the four fabric ports 48 of the DLC 14-N. A DLC chassis 14 is an independent network element containing components for switching packet-based traffic to and from the network 8, for example.

Figure 8:
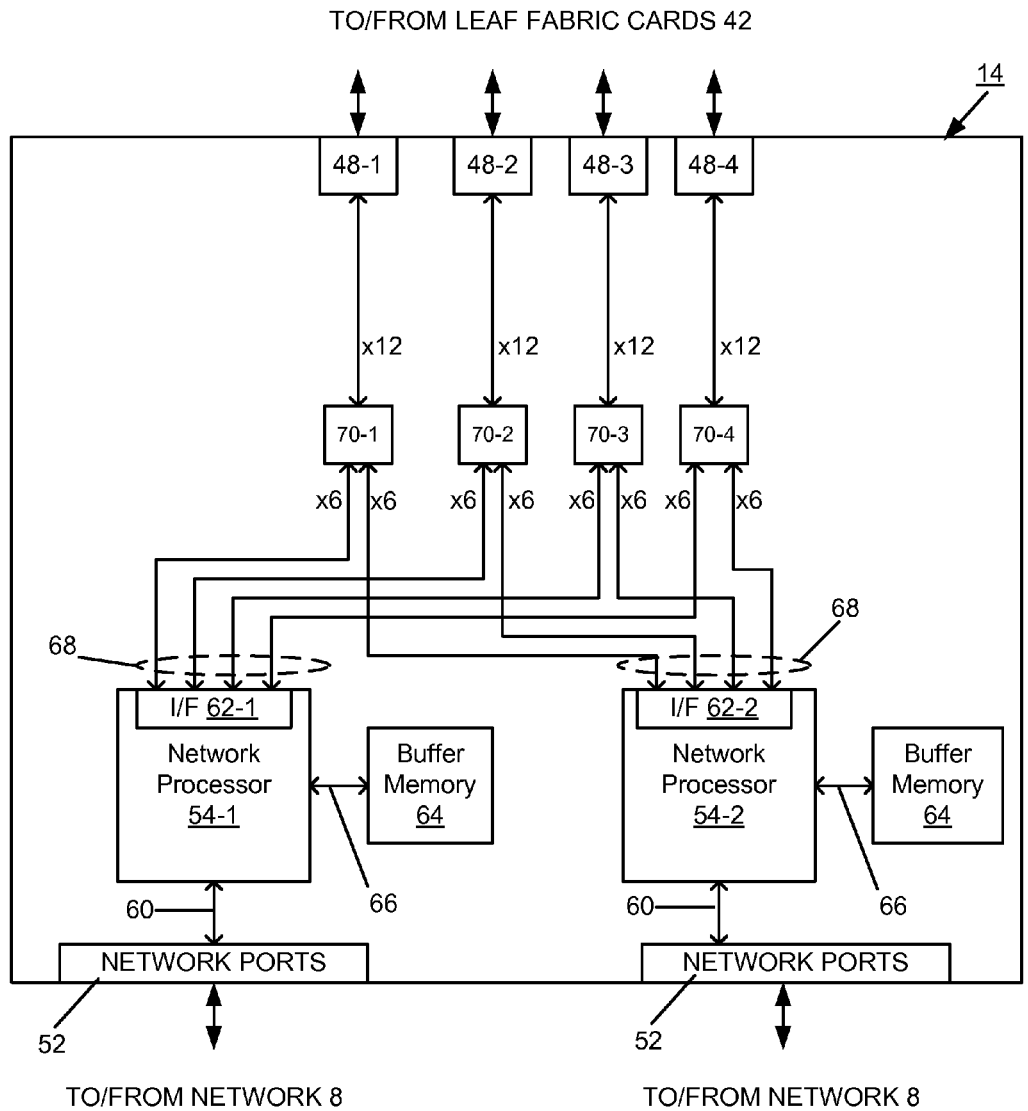
FIG. 8 is a functional block diagram of an embodiment of a DLC including two network processors with fabric interfaces.

FIG. 8 shows an embodiment of a DLC 14 that can be used in the distributed virtual chassis shown in FIG. 7. Each DLC chassis 14 has a plurality of network ports 52 for communicating over the network 8 and a plurality of network processors 54-1, 54-2 (generally, 54). Each network processor 54 is in communication with every DLC fabric port 48 and with a subset (e.g., one-half) of the network ports 52. In brief, each network processor 54 splits packets received on its network ports 52 into cells and forwards the cells to the SFC chassis 12 over the fabric ports 48; and in the opposite direction, each network processor 54 reassembles packets from cells arriving over its fabric ports 48 and forwards the packets over the network ports 52.

Each of the network processors 54-1, 54-2 is in communication with the front network ports 52 through a PHY interface 60. In addition, each network processor 54-1, 54-2 of the DLC 14 has a fabric interface (I/F) 62-1, 62-2, respectively, and is in communication with buffer memory 64 over memory channels 66. The fabric interface 62 of each network processor 54 provides SerDes channels 68, preferably twenty-four in number. These twenty-four SerDes channels 68 are grouped into four sets of six channels each. Each SerDes channel provides, for example, 10.3 Gbps of bandwidth. The DLC 14 further includes PHYs 70-1, 70-2, 70-3, 70-4 (generally 70) in communication with the four fabric ports 48-1, 48-2, 48-3, 48-4, respectively, of the DLC 14. In addition, each of the PHYs 70 is in communication with a group of six SerDes channels 68 from each of the two network processors 54-1, 54-2; accordingly, each PHY 70 supports twelve SerDes channels 68. An example implementation of the network processors 54 is the BCM 88650, a 20-line rate port, 10 GbE switch chip produced by Broadcom, of Irvine, Calif.

Preferably, each fabric port 48 of the DLC 14 includes a 120 Gbps CXP interface. In one embodiment, the CXP interface has twelve transmit and twelve receive lanes (12x), each lane providing a 10 Gbps channel. A description of the 120 Gbps 12x CXP interface can be found in the "Supplement to InfiniBand™ Architecture Specification Volume 2 Release 1.2.1", published by the InfiniBand™ Trade Association. This embodiment of 12-lane CXP is referred to as the standard Infiniband (IB) CXP. In another embodiment, the CXP interface has 10 lanes (10x) for supporting 10-lane applications, such as 100 Gigabit Ethernet. This embodiment of 10-lane CXP is referred to as the Ethernet CXP.

Figure 9:
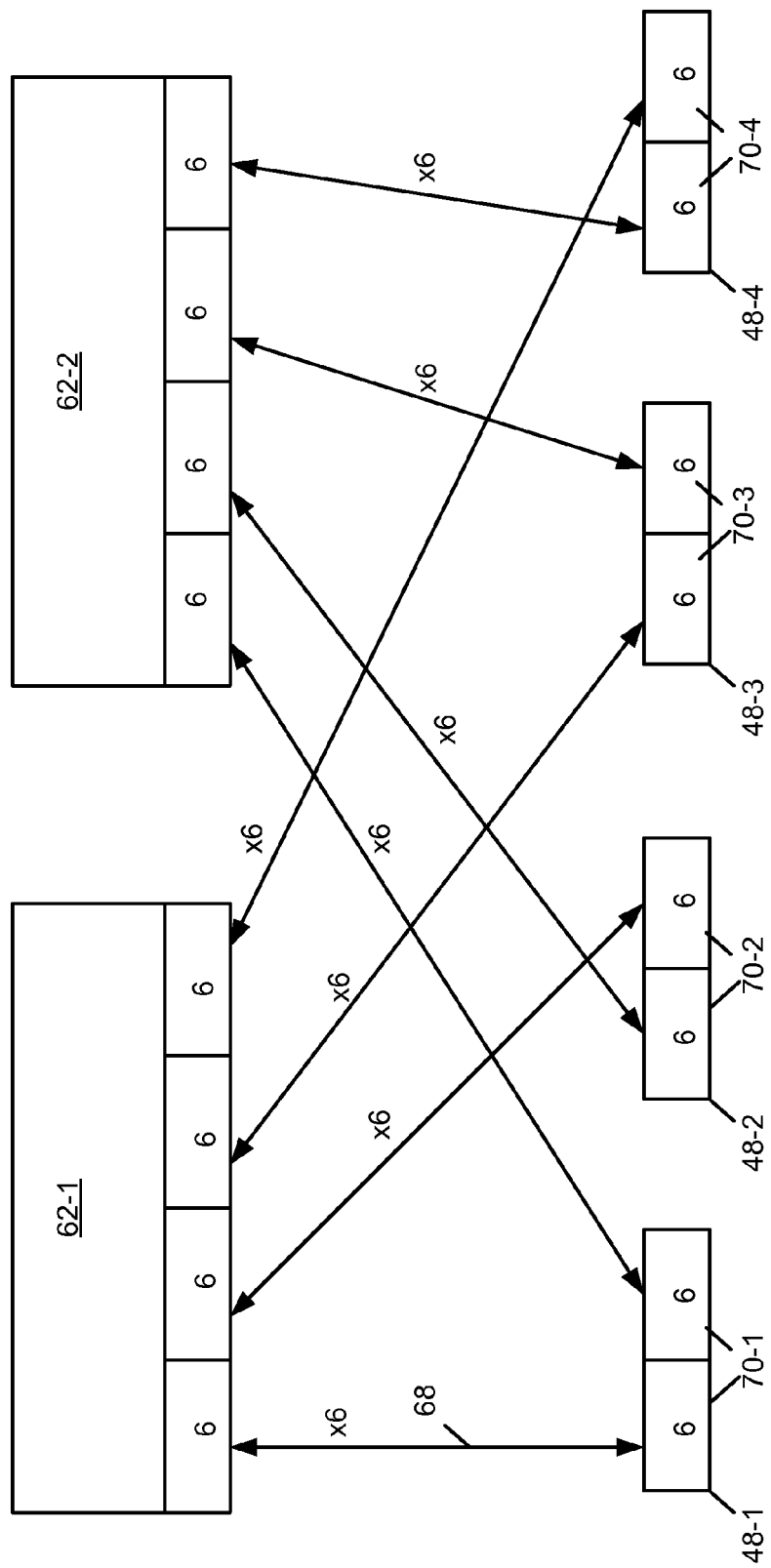
FIG. 9 is a diagram of an embodiment of interconnections between the fabric interfaces of the two network processors and the CXP/PHYs of a two-switch DLC.

FIG. 9 shows an embodiment of the interface connections between the fabric interfaces 62-1, 62-2 (generally, 62) of the two network processors 54-1, 54-2, respectively, and the CXP fabric ports 48 of the DLC 14. In FIG. 9, the PHYs 70-1, 70-2, 70-3, and 70-4 are incorporated into the CXP fabric ports 48-1, 48-2, 48-3, and 48-4, respectively, with each CXP fabric port 48 supporting twelve lanes. These twelve lanes map to six SerDes channels from each of the two fabric interfaces 62-1, 62-2. Each fabric interface 62 provides twenty-four SerDes channels 68 divided into four groups of six channels. For each of the fabric interfaces 62, one group of six SerDes channels 68 passes to a different one of the four fabric ports 48. For example, one group of six SerDes channels from each fabric interface 62-1, 62-2 maps to the PHYs 70-1 of the CXP fabric port 48-1, a second group of six SerDes channels from each fabric interface 62-1, 62-2 maps to the PHYs 70-2 of the CXP fabric port 48-2, a third group of six SerDes channels from each fabric interface 62-1, 62-2 maps to the PHYs 70-3 of the CXP fabric port 48-3, and a fourth group of six SerDes channels from each fabric interface 62-1, 62-2 maps to the PHYs 70-4 of the CXP fabric port 48-4.

Figure 10:
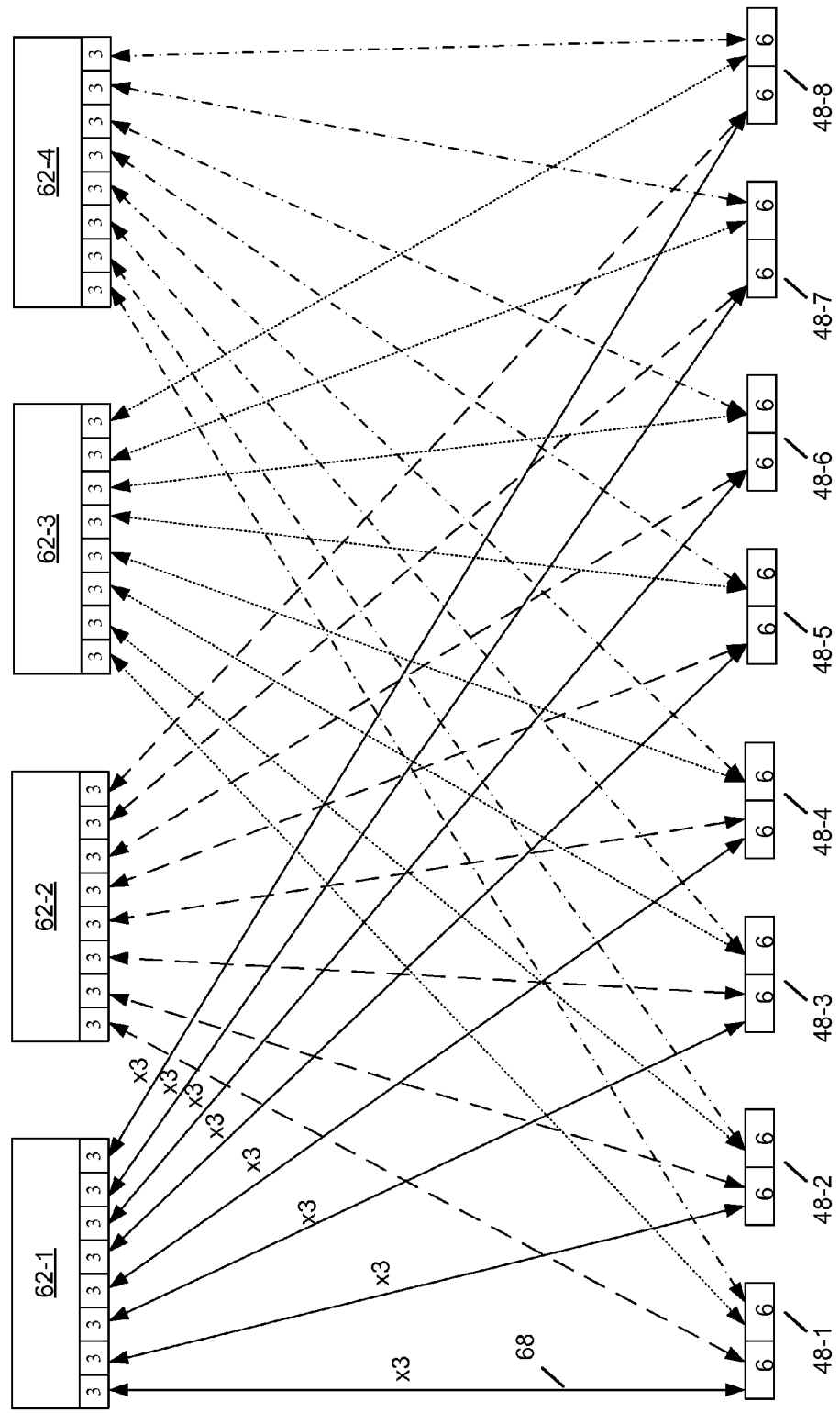
FIG. 10 is a diagram of an embodiment of interconnections between the fabric interfaces of the four network processors and the eight CXP/PHYs of a four-switch DLC.

The principles illustrated by the interface connections of FIG. 9 apply to other embodiments of the DLC 14. For example, consider an example embodiment of a DLC having four network processors 54 and eight CXP fabric ports 48, each supporting 12 lanes. FIG. 10 shows an embodiment of the interface connections between the fabric interfaces 62-1, 62-2, 62-3, and 62-4 of the four network processors and the eight CXP fabric ports 48-1 to 48-8 (generally, 48)—the PHYs being included within the CXP fabric ports. Further, in this example, the twenty-four SerDes channels provided by each fabric interface 62 are partitioned into eight groups of three SerDes channels each. Each group of three SerDes channels of a given fabric interface 62 is mapped to a different one of the eight CXP fabric ports 48. In addition, three SerDes channels from each of the four fabric interfaces 62 are mapped to each CXP fabric port 48.

Figure 11:
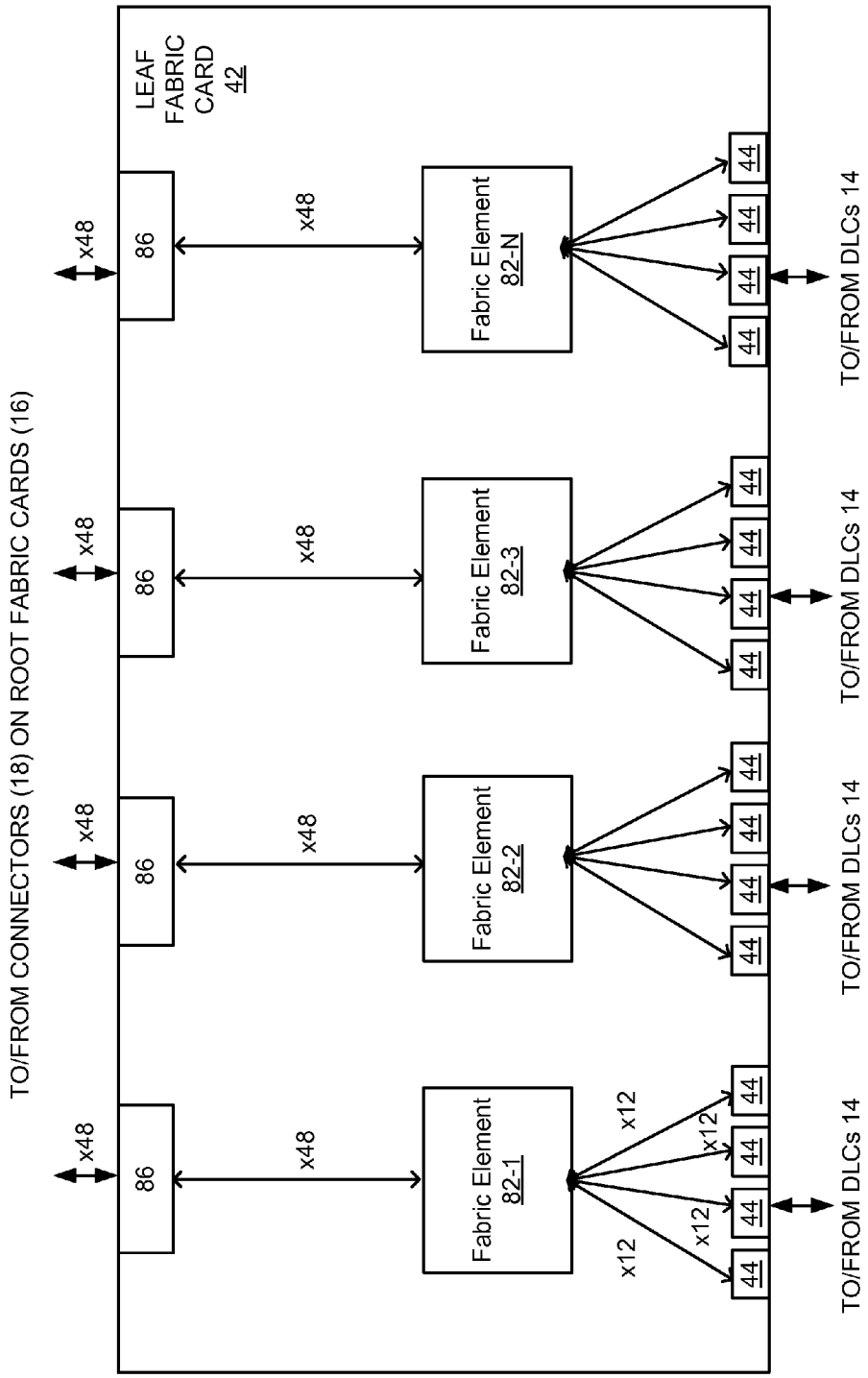
FIG. 11 is a diagram of an embodiment of a leaf fabric line card.

FIG. 11 shows an embodiment of a leaf fabric card 42 with sixteen fabric ports 44, each fabric port 44 connected to one of a plurality of fabric elements 82-1, 82-2, 82-3, 82-N (generally, 82). An example implementation of the fabric elements 82 is the previously noted FE 1600 (BCM 88750) produced by Broadcom of Irvine Calif. In one embodiment, each fabric port 44 includes a 120 Gbps CXP interface. In one embodiment, the CXP interface has twelve transmit and twelve receive lanes (12x), each lane providing a 10 Gbps channel. As indicated, 48 lanes pass to each fabric element 82 through a set of four fabric ports 44.

The leaf fabric card 42 further includes a plurality of electrical connectors 86 on its back-facing side. Each electrical connector 86 makes a physical and electrical connection with electrical connectors 18 of the root fabric cards 16 (FIG. 2B) installed in the back of the modular SFC chassis 12. The electrical connectors 86 of the leaf fabric card 42 have the same form factor as and more pins than the fabric connectors 40 of the network line card 22.

In general, the type of SFC chassis determines the total number of front-facing fabric ports 44 of the SFC chassis 12. For example, when leaf fabric cards 42 have sixteen front-facing fabric ports 44, a 2 RU (rack-unit) SFC chassis can support 32 fabric ports 44, a 4 RU SFC chassis can support 64 fabric ports and a modular SFC chassis can support 256 fabric ports.

Figure 12:
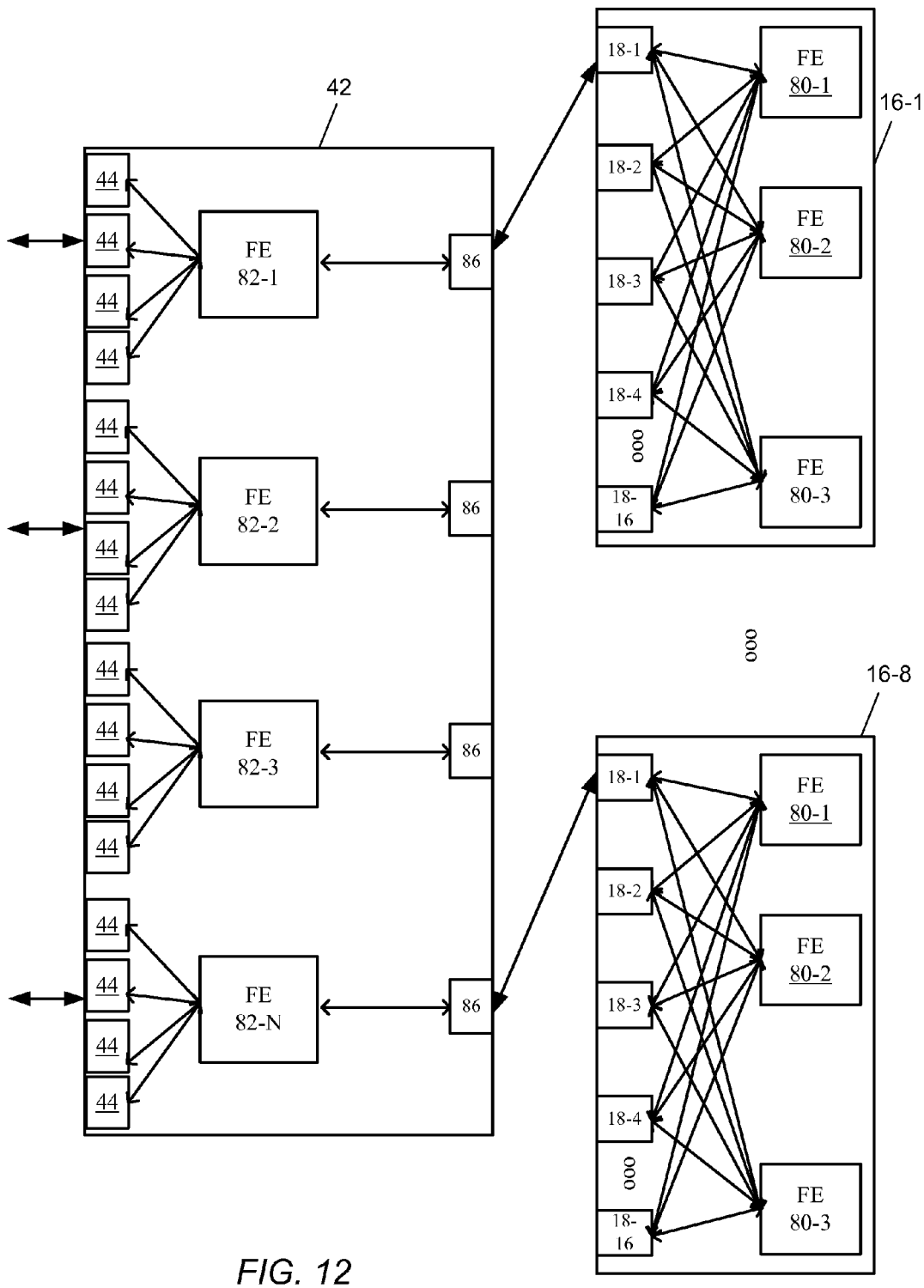
FIG. 12 is a diagram of the connectivity between the leaf fabric line card of FIG. 11 and the root fabric cards of a modular SFC chassis.

FIG. 12 shows an example of the connectivity between the leaf fabric card 42 of FIG. 11 and the root fabric cards 16 in the SFC chassis 12. Leaf fabric cards 42 in combination with root fabric cards 16 form a CLOS of fabric elements 80, 82. In this example, the SFC chassis 12 (FIG. 2A) can hold eight root fabric cards 16-1 to 16-8 and has sixteen slots available (i.e., root fabric cards have 16 fabric ports 18-1 to 18-16). In addition, each root fabric card 16 has three fabric elements 80-1, 80-2, and 80-3. Further consider, for example, that the leaf fabric card 42 resides in a topmost slot 20 (FIG. 2A) of the SFC chassis 12. In this slot position, one connector 86 of the leaf fabric card 42 connects to the topmost fabric port 18-1 of each of the eight root fabric cards 16-1 through 16-8.

Figure 13:
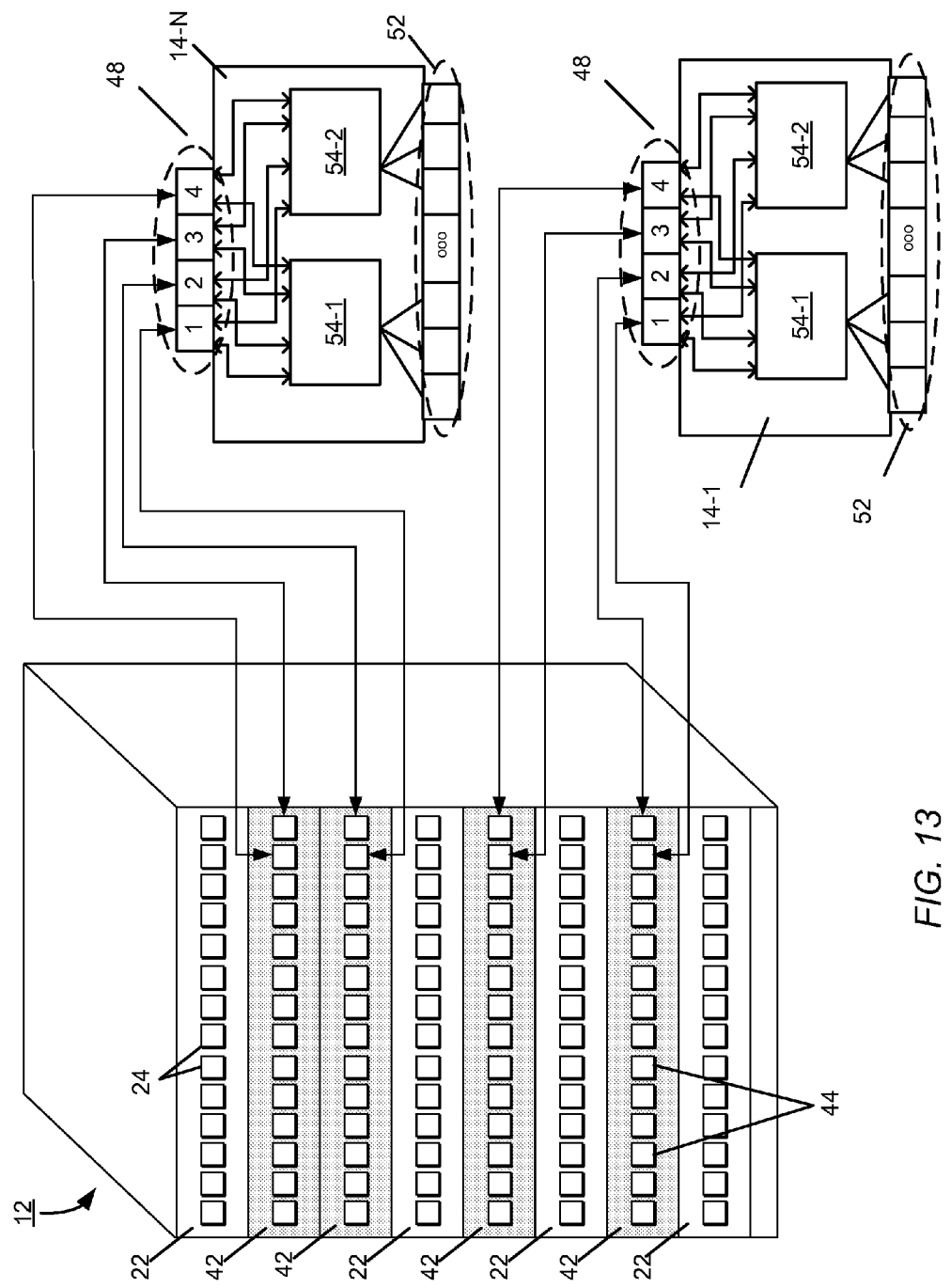
FIG. 13 is a front view of a mixed-mode configuration of the modular SFC chassis in communication with a plurality of DLC chassis.

FIG. 13 shows a front view of a mixed-mode configuration of the physical modular SFC chassis 12. In this configuration, one or more of the front slots 20 (FIG. 2A) of the SFC chassis 12 have a switch-based network line card 22 and the other front slots 20 have a leaf fabric card 42. The mixed-mode configuration provides a single cell-switched domain. In the example shown, the eight slots 20 of the SFC chassis 12 are divided evenly between the two types of line cards: slots 1, 3, 5, and 8—slot 1 being the bottom slot; slot 8, the top—being occupied by switch-based line cards 22 and slots 2, 4, 6, and 7 being occupied by leaf fabric cards 42. Other arrangements of these cards are possible; for example, the four switch-based network line cards 22 can be in the top four slots and the four leaf fabric cards 42 can be in the bottom four slots. In addition, mixed-mode configurations can have other numerical combinations of the two card types, for example, two cards of one type, and six cards of the other.

The fabric ports 44 of the leaf fabric cards 42 are for connecting to DLCs 14 (here, for example, DLC 14-1 and DLC 14-N); whereas the network ports 24 of the switch-based network line cards 22 are for connecting to servers or to other Ethernet switches. Each root fabric card 16 (FIG. 2B) is adapted to provide a cell-switching bandwidth at least as high as the aggregate bandwidth of the various line cards connected to it. In one embodiment, the aggregate cell-switching bandwidth is 30 Terabits per second. For example, consider an SFC chassis 12 with 16 slots filled with leaf fabric cards 42, each leaf fabric card 42 having 16 fabric ports 44, and each fabric port capable of supporting a total bandwidth of 120 Gbs. In this configuration, each root fabric card 16 in the SFC chassis 12 thus supports the cell-switching bandwidth of the 256 (16*16) fabric ports (256*120 Gbps=30,720 Gbps or approximately 30 Tbps).

Figure 14:
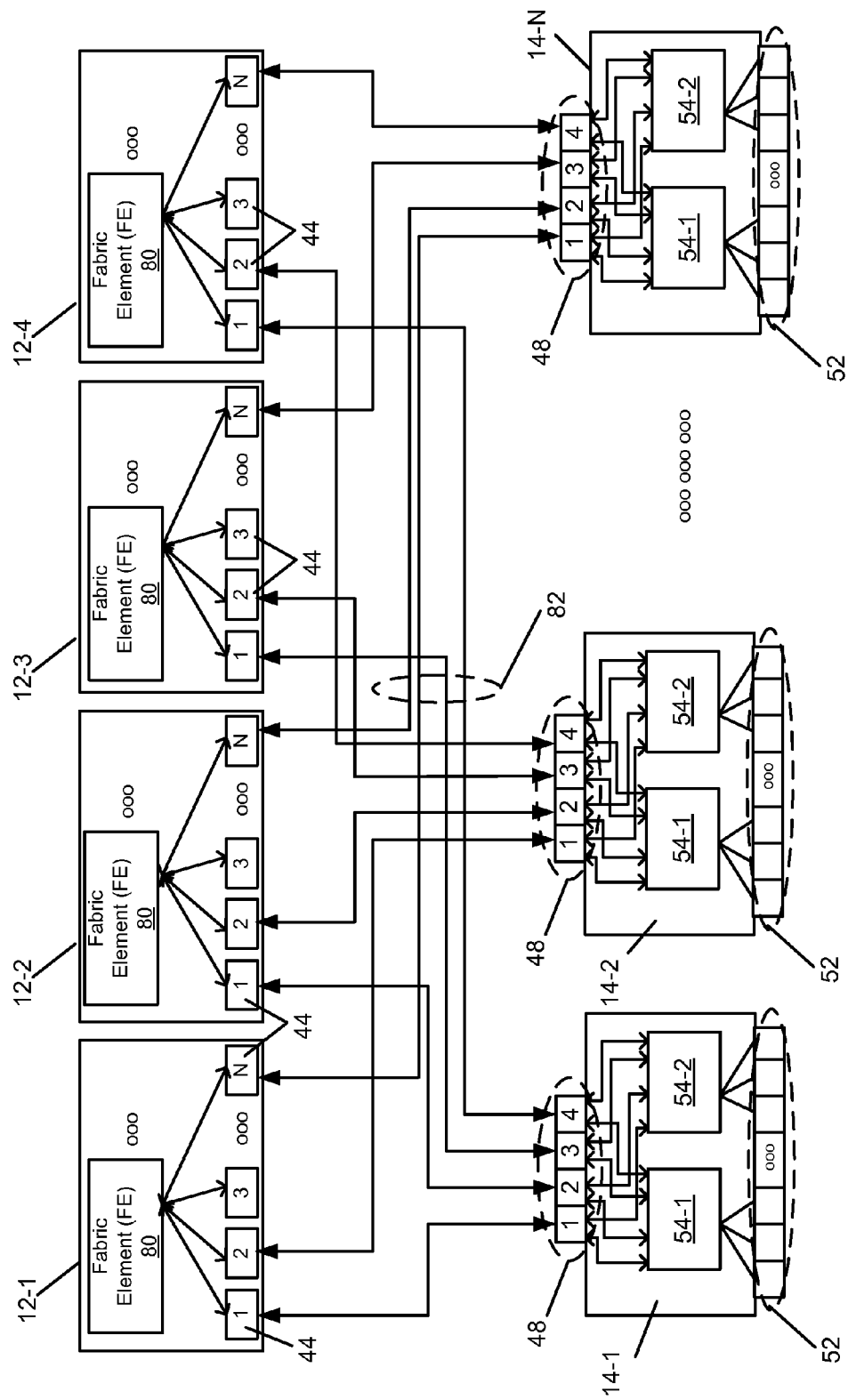
FIG. 14 is a functional block diagram of an embodiment of a distributed virtual chassis having a plurality of SFC chassis interconnected with a plurality of DLC chassis.

FIG. 14 shows an embodiment of a distributed virtual chassis having a plurality of independent SFC chassis 12-1, 12-2, 12-3, and 12-4 (generally, 12) in communication with a plurality of DLC chassis or boxes 14-1, 14-2, 14-N (generally, 14). This example embodiment has four SFC chassis and N DLC chassis 14. The number, N, of DLCs can range in the hundreds and thousands. The SFCs 12 and DLCs 14 are part of a single cell-based switched domain.

Each SFC chassis 12 includes a set of cell-based switch fabric elements (FE) 80 in communication with N SFC fabric ports 44, there being at least as many SFC fabric ports 44 in each SFC chassis 12 as the number of DLC chassis 14 in the distributed virtual chassis. Each set of fabric elements 80 corresponds to a CLOS of fabric elements residing on leaf fabric cards and root fabric cards, as described above. Each set of fabric elements 80 of an SFC chassis 12 switches cells between fabric ports 44 based on the destination information in the cell header.

Each DLC chassis 14 has network ports 52, network processors 54-1, 54-2 and fabric ports 48. The network ports 52 are in communication with the network 8 external to the switched domain, such as the Internet. In one embodiment, each DLC chassis 14 has forty network ports 20, with each of the network ports 52 being configured as a 10 Gbps Ethernet port. The aggregate network bandwidth of the DLC chassis 14 is 400 Gbps.

The distributed virtual chassis in FIG. 14 has a full-mesh configuration: each DLC 14 is in communication with each of the SFCs 12; more specifically, each of the fabric ports 48 of a given DLC chassis 14 is in electrical communication with a fabric port 44 of a different one of the SFCs 12 over a communication link 82. Referring to the DLC 14-1 as a representative example, the DLC fabric port 48-1 of the DLC 14-1 is in communication with the fabric port 44-1 of the SFC 12-1, the DLC fabric port 48-2 with the fabric port 44-1 of the SFC 12-2, the DLC fabric port 48-3 with the fabric port 44-1 of the SFC 12-3, and the DLC fabric port 48-4 with the fabric port 44-1 of the SFC 12-4. Connected in this full-mesh configuration, the DLCs and SFCs form the distributed virtual chassis, with the DLCs acting as line cards. As an example, four 256-fabric port SFC chassis 12 together can connect up to 256 DLC chassis 14. The distributed virtual chassis is modular; that is, DLCs 14 can be added to or removed from the distributed virtual chassis, one at a time, like line cards added to or removed from a chassis.

The communication link 82 between each DLC fabric port 48 and an SFC fabric port 44 can be a wired connection. Interconnect variants include Direct Attached Cable (DAC) or optical cable. DAC provides five to seven meters of cable length; whereas the optical cable offers up to 100 meters of connectivity within the data center, (standard optical connectivity can exceed 10 km). Alternatively, the communication link 82 can be a direct physical connection (i.e., electrical connectors of the DLC fabric ports 48 physically connect directly to electrical connectors of the SFC fabric ports 44).

During operation of the distributed virtual chassis, a packet arrives at a network port 52 of one of the DLCs 14. The network processor 54 of the DLC 14 receives each packet and adds meta data/pre-classification header to each packet. Network processor 54 then partitions the packet into one or more fixed size cells. The network processor 54 sends the cells out through the fabric ports 48 to each of the SFCs 12, sending different cells to different SFCs 12. For example, consider an incoming packet with a length of 1600 bits. The receiving network processor 54 of the DLC 14 can split the packet into four cells of 400 bits (before adding header information to those cells). The network processor 54 then sends a different cell to each of the four SFCs 12, in effect, achieving a load balancing of the cells across the SFCs 12.

A cell-based switch fabric element 80 of each SFC 12 receiving a cell examines the header of that cell, determines its destination, and sends the cell out through the appropriate one of the fabric ports 44 of that SFC to the destination DLC 14. The destination DLC 14 receives all cells related to the original packet from the SFCs, reassembles the original packet (i.e., removing the added headers, combining cells), and sends the reassembled packet out through the appropriate one of its network ports 52. Continuing with the previous four-cell example, consider that each SFC determines that the destination DLC is DLC 14-2. Each SFC 12 sends its cell out through its fabric port 44-2 to the DLC 14-2. The DLC 14-2 reassembles the packet from the four received cells (the added headers providing an order in which to combine the cells) and sends the packet out of the appropriate network port 52. The pre-classification header information in the cells determines the appropriate network port.

The full-mesh configuration of FIG. 14, having the four SFC chassis 12, is a full-line rate configuration, that is, the aggregate bandwidth for transmitting cells from a given DLC to the SFCs (i.e., 480 Gbps) is greater than the aggregate bandwidth of packets arriving at the given DLC on the network ports 52 (i.e., 400 Gbps). The configuration can also be adapted to support various oversubscription permutations for DLCs 14. For example, instead of having four SFCs, the distributed virtual chassis may have only two SFC chassis 12-1, 12-2, with each DLC 14 using only two fabric ports 48 for communicating with the SFC chassis 12, one fabric port 48 for each of the two SFC chassis 12. This permutation of oversubscription has, for example, each DLC on its network side with an aggregate ingress 400 Gbps bandwidth (forty 10 Gbps Ethernet Ports) and an aggregate egress 240 Gbps cell-switching bandwidth on its two 120 Gbps fabric ports 48 for communicating with the two SFCs. Other oversubscription permutations can be practiced.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C#, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A scaled-out fabric coupler (SFC) chassis comprising:
   a plurality of root fabric cards installed on one side of the SFC chassis, each root fabric card having a plurality of electrical connectors, all root fabric cards having a same first orientation within the SFC chassis;
   a plurality of slots on a side of the SFC chassis opposite the one side in which the root fabric cards are installed, all slots of the plurality of slots having a same second orientation within the SFC chassis, the second orientation being crosswise the first orientation of the root fabric cards; and
   a plurality of line cards installed in the plurality of slots on the opposite side of the SFC chassis allowing for scalability, each line card being one of two types of line cards allowing flexibility of configuration, one of the two types of line cards being a switch-based network line card having network ports for connecting to, and communicating with servers and switches in a packet-based format, the other of the two types of line cards being a leaf fabric card having fabric ports for connecting to and communicating with a fabric port of a switching network element in a cell-based format, both types of line cards having a same modular form factor adapted for installation in any slot of the plurality of slots, each of the two types of the line cards having electrical connectors that mate with one electrical connector of each root fabric card installed in the SFC chassis such that each line card of either type of line card, when installed in one slot of the plurality of slots, physically connects to all root fabric cards installed in the SFC chassis.

2. The SFC chassis of claim 1, wherein the electrical connectors of the network line card have a same form factor as and fewer pins than the electrical connectors of the leaf fabric card.

3. The SFC chassis of claim 1, wherein each root fabric card has a cell-based switch fabric.

4. The SFC chassis of claim 1, wherein the network ports of the switch-based network line cards are Ethernet ports.

5. The SFC chassis of claim 1, wherein the switch-based network line card divides incoming packets into cells, adds header information to the cells, and distributes the cells among the root fabric cards.

6. The SFC chassis of claim 1, wherein the SFC chassis provides a single cell-based switching domain.

7. The SFC chassis of claim 1, wherein, in one configuration of the SFC chassis, at least one of the installed line cards is a switch-based network line card with network ports for connecting to servers and switches and each of the other installed line cards is a leaf fabric card with fabric ports for connecting to fabric ports of switching network elements.

8. The SFC chassis of claim 1, wherein in a first configuration of the SFC chassis, every installed line card is a switch-based network line card with network ports for connecting to servers and switches, and in a second configuration of the same SFC chassis every installed line card is a leaf fabric card with fabric ports for connecting to fabric ports of switching network elements.

9. The SFC chassis of claim 8, wherein, in a third configuration of the SFC chassis, at least one of the installed line cards is a switch-based network line card with network ports for connecting to servers and switches, and each of the other installed line cards is a leaf fabric card with fabric ports for connecting to fabric ports of switching network elements.

10. A distributed virtual chassis comprising:
a plurality of scaled-out fabric coupler (SFC) chassis, each SFC chassis comprising:
- a plurality of slots on one side of the SFC chassis, all slots of the plurality of slots having a same first orientation within the SFC chassis;
- a plurality of line cards installed in the plurality of slots on the one side of the SFC chassis allowing for scalability; and
- a plurality of root fabric cards installed on the opposite side of the SFC chassis, all root fabric cards having a same second orientation within the SFC chassis, the second orientation being crosswise the first orientation of the slots of the plurality of slots, each root fabric card being capable of connecting to multiple different types of line cards having a same modular form factor adapted for installation in any slot of the plurality of slots, one of the multiple different types of line cards being a switch-based network line card having network ports for connecting to, and communicating with servers and switches in a packet-based format, another of the multiple different types of line cards being a leaf fabric card having fabric ports for connecting to, and communicating with a fabric port of a distributed line card (DLC) chassis, each root fabric card physically connecting to all line cards installed on the one side of the SFC chassis, each root fabric card further including a cell-based fabric element that switches cells subdivided from a packet among the ports of the line cards installed in the SFC chassis.

11. The distributed virtual chassis of claim 10, wherein the electrical connectors of the network line card have a same form factor as and fewer pins than the electrical connectors of the leaf fabric card.

12. The distributed virtual chassis of claim 11, wherein each switch-based network line card installed in the chassis divides packets arriving on its network ports into cells, adds header information to the cells, and distributes the cells among the root fabric cards.

13. The distributed virtual chassis of claim 10, wherein one or more of the line cards installed in one of the SFC chassis is a leaf fabric card having fabric ports, and further comprising:
- a plurality of distributed line card (DLC) chassis, each DLC chassis having a plurality of network ports for receiving packet-based traffic flows and a plurality of DLC fabric ports through which that DLC chassis is connected to the fabric ports of the one or more leaf fabric cards installed in the SFC chassis.

14. The distributed virtual chassis of claim 13, where each of the DLC chassis is connected to each of the SFC chassis.

15. The distributed virtual chassis of claim 10, wherein the network ports of the switch-based network line cards are Ethernet ports.

16. The distributed virtual chassis of claim 10, wherein, in one configuration of a given one of the SFC chassis, at least one of the installed line cards is a switch-based network line card with network ports for connecting to servers and switches and at least one of the installed line cards is a leaf fabric card with fabric ports for connecting to fabric ports of the plurality of DLC chassis.

17. The distributed virtual chassis of claim 10, wherein in a first configuration of a given one of the SFC chassis, every installed line card is a switch-based network line card with network ports for connecting to servers and switches, and in a second configuration of the given one of the same SFC chassis every installed line card is a leaf fabric card with fabric ports for connecting to fabric ports of the plurality of DLC chassis.

18. The distributed virtual chassis of claim 17, wherein, in a third configuration of the given one of the SFC chassis, at least one of the installed line cards is a switch-based network line card with network ports for connecting to servers and switches, and each of the other installed line cards is a leaf fabric card with fabric ports for connecting to fabric ports of the plurality of DLC chassis.

19. A scaled-out fabric coupler (SFC) chassis comprising:
- a plurality of slots on one side of the SFC chassis, all slots of the plurality of slots having a same first orientation within the SFC chassis;
- a plurality of line cards installed in the plurality of slots on the one side of the SFC chassis allowing for scalability; and
- a plurality of root fabric cards installed on the opposite side of the SFC chassis, all root fabric cards having a same second orientation within the SFC chassis, the second orientation being crosswise the first orientation of the slots of the plurality of slots, each root fabric card being capable of connecting to multiple different types of line cards having a same modular form factor adapted for installation in any slot of the plurality of slots allowing flexibility of configuration, one of the multiple different types of line cards being a switch-based network line card having network ports for connecting to, and communicating with servers and switches in a packet-based format, another of the multiple different types of line cards being a leaf fabric card having fabric ports for connecting to, and communicating with a fabric port of a switching network element in a cell-based format, each root fabric card physically connecting to all line cards installed on the one side of the SFC chassis, each root fabric card further including a cell-based fabric element that switches cells subdivided from packets among the ports of the line cards installed in the SFC chassis.

20. The SFC chassis of claim 19, wherein the electrical connectors of the network line card have a same form factor as and fewer pins than the electrical connectors of the leaf fabric card.

21. The SFC chassis of claim 19, wherein the network ports of the switch-based network line cards are Ethernet ports.

22. The SFC chassis of claim 19, wherein the switch-based network line card divides incoming packets into cells, adds header information to the cells, and distributes the cells among the root fabric cards.

23. The SFC chassis of claim 19, wherein, in one configuration of the SFC chassis, at least one of the installed line cards is a switch-based network line card with network ports for connecting to servers and switches and each of the other installed line cards is a leaf fabric card with fabric ports for connecting to fabric ports of switching network elements.

24. The SFC chassis of claim 19, wherein in a first configuration of the SFC chassis, every installed line card is a switch-based network line card with network ports for connecting to servers and switches, and in a second configuration of the SFC chassis every installed line card is a leaf fabric card with fabric ports for connecting to fabric ports of switching network elements.

25. The SFC chassis of claim 24, wherein, in a third configuration of the SFC chassis, at least one of the installed line cards is a switch-based network line card with network ports for connecting to servers and switches, and each of the other installed line cards is a leaf fabric card with fabric ports for connecting to fabric ports of switching network elements.

* * * * *